US012561934B2

(12) United States Patent
Pribble et al.

(10) Patent No.: US 12,561,934 B2
(45) Date of Patent: Feb. 24, 2026

(54) AUTOMATIC ORIENTATION CORRECTION FOR CAPTURED IMAGES

(71) Applicant: Capital One Services, LLC, McLean, VA (US)

(72) Inventors: Jason Pribble, McLean, VA (US); Swapnil Patil, Chantilly, VA (US); Timothy Tran, Springfield, VA (US)

(73) Assignee: Capital One Services, LLC, McLean, VA (US)

( * ) Notice: Subject to any disclaimer, the term of this patent is extended or adjusted under 35 U.S.C. 154(b) by 321 days.

(21) Appl. No.: 18/182,536

(22) Filed: Mar. 13, 2023

(65) Prior Publication Data

US 2024/0312173 A1 Sep. 19, 2024

(51) Int. Cl.
*G06V 10/24* (2022.01)
*G06V 10/70* (2022.01)
(Continued)

(52) U.S. Cl.
CPC ............ *G06V 10/242* (2022.01); *G06V 10/70* (2022.01); *G06V 30/10* (2022.01); *G06V 40/161* (2022.01); *G06V 40/171* (2022.01)

(58) Field of Classification Search
CPC .... G06V 10/24; G06V 10/242; G06V 10/243; G06V 10/245; G06V 10/248;
(Continued)

(56) References Cited

U.S. PATENT DOCUMENTS

2014/0140609 A1* 5/2014 Krishnaswamy ....... G06T 3/608
382/199
2015/0324954 A1* 11/2015 Palanivel .................. G06T 3/60
358/474
(Continued)

FOREIGN PATENT DOCUMENTS

CN 113887484 A 1/2022

OTHER PUBLICATIONS

Pyszkiewicz, K., Kazemi, V., Xu, H., Song, X., Cheng, S., Cui, J., Dai, S., Mao, K., Kulkarni, M., Sah, S. and Cannon, M., 2018. Image enhancement suggestions based on machine learning. (Year: 2018).*

(Continued)

*Primary Examiner* — Oneal R Mistry
*Assistant Examiner* — Duy Tran
(74) *Attorney, Agent, or Firm* — Harrity & Harrity, LLP

(57) ABSTRACT

In some implementations, a device may receive an image of a document, the image depicting a reference feature associated with the document, the reference feature including at least one of: a face of a person, a machine-readable code, or a text field. The device may identify a rotational angle of the reference feature as depicted in the image based on comparing the reference feature as depicted in the image to one or more orientation parameters of the reference feature associated with a display orientation associated with the document. The device may rotate the image of the document by an angle to obtain an orientated image of the document, (Continued)

the angle being based on the rotational angle of the reference feature as depicted in the image. The device may provide the orientated image of the document for display.

20 Claims, 6 Drawing Sheets

(51) Int. Cl.
*G06V 30/10* (2022.01)
*G06V 40/16* (2022.01)

(58) Field of Classification Search
CPC .... G06V 10/70; G06V 10/757; G06V 10/759; G06V 10/774; G06V 30/10; G06V 30/133; G06V 30/1465; G06V 30/1475; G06V 30/1908; G06V 30/42; G06V 40/168; G06V 40/169; G06V 40/171; G06V 40/172; G06V 40/16; G06V 40/161; G06V 10/82; G06V 30/1463

See application file for complete search history.

(56) References Cited

U.S. PATENT DOCUMENTS

| | | |
|---|---|---|
| 2015/0348237 A1 | 12/2015 | Chen |
| 2016/0210490 A1 | 7/2016 | Li et al. |
| 2020/0259973 A1* | 8/2020 | Lundwuist ........... G06V 30/414 |
| 2020/0311844 A1* | 10/2020 | Luo ..................... G06F 18/2178 |
| 2020/0387702 A1* | 12/2020 | Pribble ................ G06V 30/142 |
| 2022/0309813 A1* | 9/2022 | Melchy ................ G06V 30/413 |
| 2023/0008443 A1 | 1/2023 | Luo et al. |

OTHER PUBLICATIONS

International Search Report and Written Opinion for International Application No. PCT/US2024/013341, mailed on Apr. 25, 2024, 16 pages.

Xing, Wu., et al., "Identity authentication on mobile devices using face verification and ID image recognition," Procedia Computer Science 162(5):932-939, 2019, 8 Pages.

* cited by examiner

300

Bus
310

Processor
320

Memory
330

Input
Component
340

Output
Component
350

Communication
Component
360

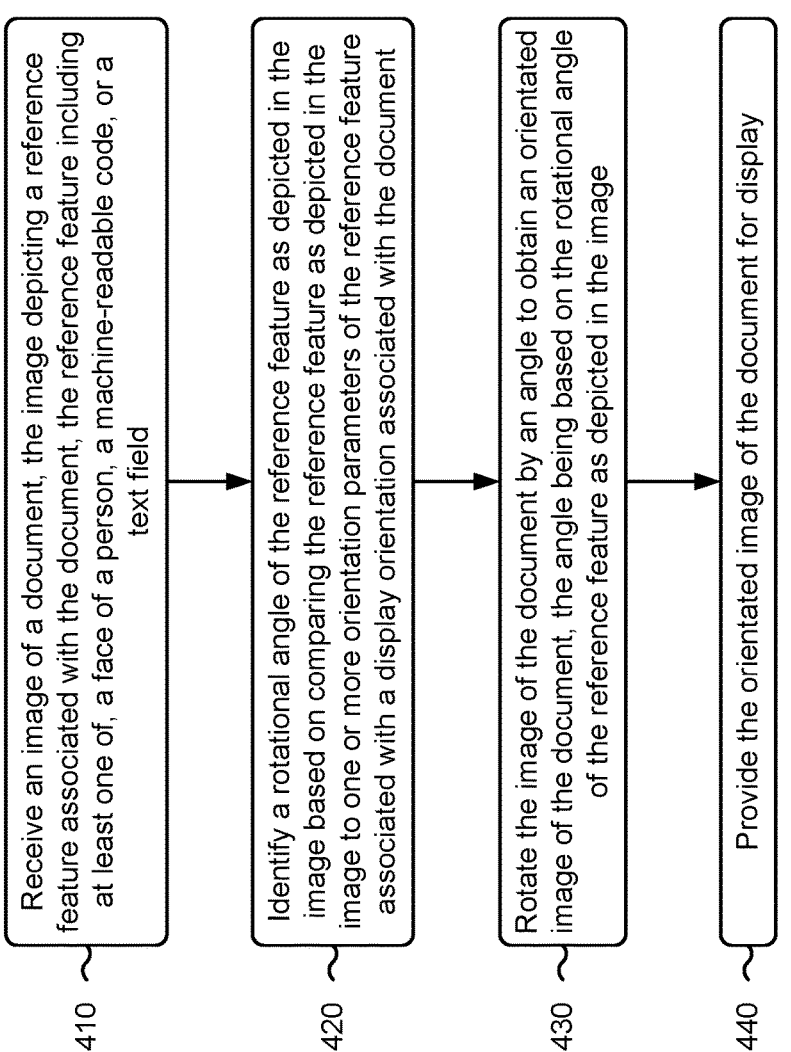

410 Receive an image of a document, the image depicting a reference feature associated with the document, the reference feature including at least one of, a face of a person, a machine-readable code, or a text field 420 Identify a rotational angle of the reference feature as depicted in the image based on comparing the reference feature as depicted in the image to one or more orientation parameters of the reference feature associated with a display orientation associated with the document 430 Rotate the image of the document by an angle to obtain an orientated image of the document, the angle being based on the rotational angle of the reference feature as depicted in the image 440 Provide the orientated image of the document for display

AUTOMATIC ORIENTATION CORRECTION FOR CAPTURED IMAGES

BACKGROUND

Image analysis is the extraction of meaningful information from images, such as from digital images by means of image processing techniques. For example, object detection is a technology related to computer vision and image processing that is associated with detecting instances of semantic objects of a certain class (such as humans, buildings, or cars) in digital images and/or videos. Object detection algorithms typically leverage machine learning or deep learning to produce meaningful results indicating objects detected in digital images and/or videos. For example, a machine learning model (such as a convolutional neural network) may be trained to automatically detect objects within images and/or videos.

SUMMARY

Some implementations described herein relate to a system for automatic orientation correction for captured images. The system may include one or more memories and one or more processors communicatively coupled to the one or more memories. The one or more processors may be configured to obtain, via a user device, an image of an identification document, the identification document including a facial image depicting a face of a user associated with the identification document. The one or more processors may be configured to input, to a machine learning model, the image of the identification document, the machine learning model being a facial recognition model that is trained to identify rotational angles of faces. The one or more processors may be configured to obtain, from the machine learning model, an indication of a rotational angle of the face depicted in the facial image based on inputting, to the machine learning model, the image of the identification document. The one or more processors may be configured to rotate the image of the identification document by an angle to obtain an orientated image of the identification document, the angle being based on the rotational angle of the face and a reference angle associated with a display orientation of the identification document. The one or more processors may be configured to provide the orientated image of the identification document for display.

Some implementations described herein relate to a method of automatic orientation correction for captured images. The method may include receiving, by a device, an image of a document, the image depicting a reference feature associated with the document, the reference feature including at least one of, a face of a person, a machine-readable code, or a text field. The method may include identifying, by the device, a rotational angle of the reference feature as depicted in the image based on comparing the reference feature as depicted in the image to one or more orientation parameters of the reference feature associated with a display orientation associated with the document. The method may include rotating, by the device, the image of the document by an angle to obtain an orientated image of the document, the angle being based on the rotational angle of the reference feature as depicted in the image. The method may include providing, by the device, the orientated image of the document for display.

Some implementations described herein relate to a non-transitory computer-readable medium that stores a set of instructions for a device. The set of instructions, when executed by one or more processors of the device, may cause the device to obtain, via a user device, an image of an identification document, the identification document including a facial image depicting a face of a user associated with the identification document. The set of instructions, when executed by one or more processors of the device, may cause the device to input, to a machine learning model, the image of the identification document, the machine learning model being a facial recognition model that is trained to identify rotational angles of faces. The set of instructions, when executed by one or more processors of the device, may cause the device to obtain, from the machine learning model, an indication of a rotational angle of the face depicted in the facial image based on inputting, to the machine learning model, the image of the identification document. The set of instructions, when executed by one or more processors of the device, may cause the device to rotate the image of the identification document by an angle to obtain an orientated image of the identification document, the angle being based on the rotational angle of the face and a reference angle associated with a display orientation of the identification document. The set of instructions, when executed by one or more processors of the device, may cause the device to provide the orientated image of the identification document for display.

BRIEF DESCRIPTION OF THE DRAWINGS

FIG. 4 is a flowchart of an example process associated with automatic orientation correction for captured images, in accordance with some embodiments of the present disclosure.

DETAILED DESCRIPTION

Figure 1A:
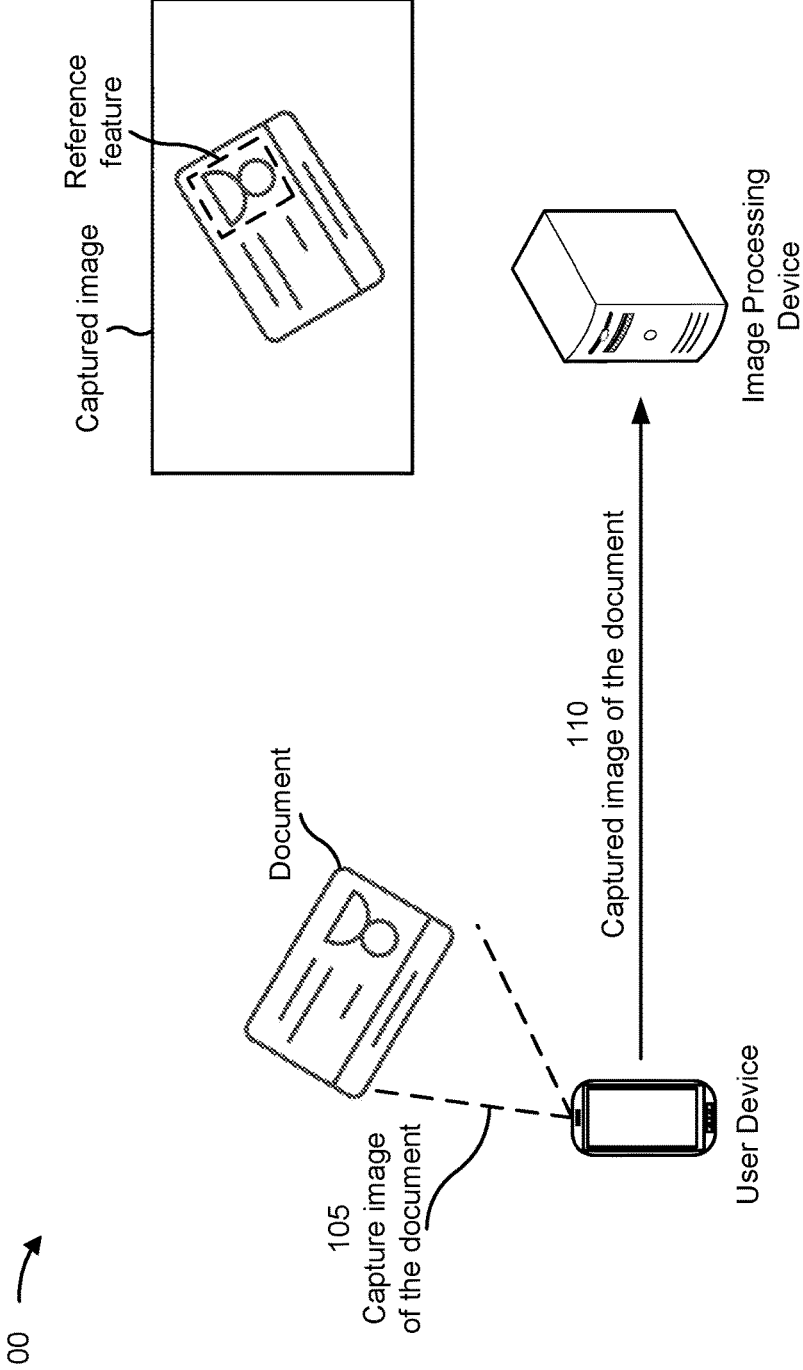
FIGS. 1A-1C are diagrams of an example associated with automatic orientation correction for captured images, in accordance with some embodiments of the present disclosure.

The following detailed description of example implementations refers to the accompanying drawings. The same reference numbers in different drawings may identify the same or similar elements.

In some examples, a device may use one or more image analysis techniques to analyze an image of a document. For example, the device may use the one or more image analysis techniques to detect an outline or a border of a document as depicted in an image (e.g., using a document detection technique). For example, document detection may include the device detecting the corners and edges of the document as depicted in the image. In some cases, a neural network or other machine learning model may be trained (e.g., using training images that include images of documents with labeled corners and/or edges) to detect the corners and edges of documents in images. As another example, a machine learning model may be trained to detect rectangles in images (e.g., because documents are generally rectangular in shape).

In some examples, the device may use a detected border or outline of a document as depicted in an image to orient the image of the document (e.g., to display the document in a correct orientation). For example, the document may be associated with an orientation (e.g., a landscape orientation or a portrait orientation) have a longer width than height or a longer height than width. The device may detect a length of the detected edges of the document and may rotate or orient the image of the document such that the document is depicted in the image with the orientation that is associated with the document. However, this may result in the document being displayed incorrectly. For example, the device may correctly orient the image such that the document is displayed in the correct orientation (e.g., a landscape orientation or a portrait orientation), but the document may be depicted upside down (e.g., with text or images in the document upside down). As a result, the device may display the image of the document with the document in the correct orientation, but with the document depicted upside down (e.g., with the document depicted incorrectly). Additionally, this may result in the device consuming processing resources, computing resources, and/or power resources associated with performing additional operations to identify that the document is not correctly depicted, correcting the orientation of the image, and/or capturing or obtaining new images of the document, among other examples.

For example, a user may capture the image of the document as part of an analysis or authentication procedure associated with the document. In some examples, the device may display the image of the document (e.g., as captured) for review by the user. In some cases, the image may depict the document in an incorrect orientation (e.g., sideways or upside down). If the device displays the image of the document in the incorrect orientation and/or incorrectly corrects the orientation of the image (e.g., as described above), the user may capture additional images of the document to correct the orientation of the image of the document to be provided for analysis and/or authentication. This may consume processing resources, computing resources, and/or power resources associated with capturing the additional images. Moreover, in some cases, a processing device or a server device may be capable of analyzing or authenticating the document even if the orientation of the image of the document is not correct. Therefore, the device may needlessly consume processing resources, computing resources, and/or power resources associated with capturing the additional images due to the image being displayed for review to the user in the incorrect orientation.

Some techniques and implementations described herein enable automatic orientation correction for captured images. For example, an image processing device may obtain (e.g., via a user device) an image of a document. In some implementations, the document may be an identification document (e.g., a document identifying a user, such as a driver's license, a passport, a resident card, and/or a citizen card). In some implementations, the document may include a reference feature. For example, the image of the document may depict the reference feature. The reference feature may include a face of a person, a machine-readable code (e.g., a barcode, a quick response (QR) code, a machine-readable zone, or another machine-readable code), and/or a text field, among other examples.

The image processing device may identify or detect a rotational angle of the reference feature as depicted in the image based on comparing the reference feature as depicted in the image to one or more orientation parameters of the reference feature associated with a display orientation associated with the document (e.g., the one or more orientation parameters may indicate a correct orientation of the reference feature when the document is in the correct orientation). For example, the display orientation of the document may be an orientation at which images of the document are to be viewed. In some implementations, the image processing device may input, to a machine learning model, the image of the document. The machine learning model may be trained to identify rotational angles of the reference feature. The image processing device may obtain, from the machine learning model, an indication of a rotational angle of the reference feature as depicted in the image.

The image processing device may rotate the image of the document by an angle to obtain an orientated image of the document. The angle may be based on the rotational angle of the reference feature as depicted in the image. For example, the angle may be based on the rotational angle of the reference feature and the one or more orientation parameters (e.g., a reference angle associated with a display orientation of the document). The display orientation may be an orientation of the document when oriented correctly. The image processing device may provide the orientated image of the document for display.

As a result, the image processing device may be enabled to correctly orient the image of the document by using the rotational angle of the reference feature as depicted in the image of the document. For example, the image processing device may use an orientation of a face as depicted in the image of the document to rotate the image of the document such that the face is orientated correctly (e.g., because the correct orientation of the document is associated with the face being oriented correctly). As a result, the image processing device may reliably and correctly orient or rotate images of documents to a correct orientation (e.g., without relying on an orientation of the edges of the document which produces unreliable orientation results, as described above). This may conserve processing resources, computing resources, and/or power resources that would have otherwise been associated with performing additional operations to identify that the document is not correctly depicted, correcting the orientation of the image, and/or capturing or obtaining new images of the document, among other examples. Further, the image of the document may be displayed to a user for review with the document depicted in the correct orientation. This may conserve processing resources, computing resources, and/or power resources that would have otherwise been associated with capturing the additional images due to the image being displayed for review to the user in the incorrect orientation (e.g., where further processing or authentication of the document could have otherwise proceeded with the original image).

Figure 1B:
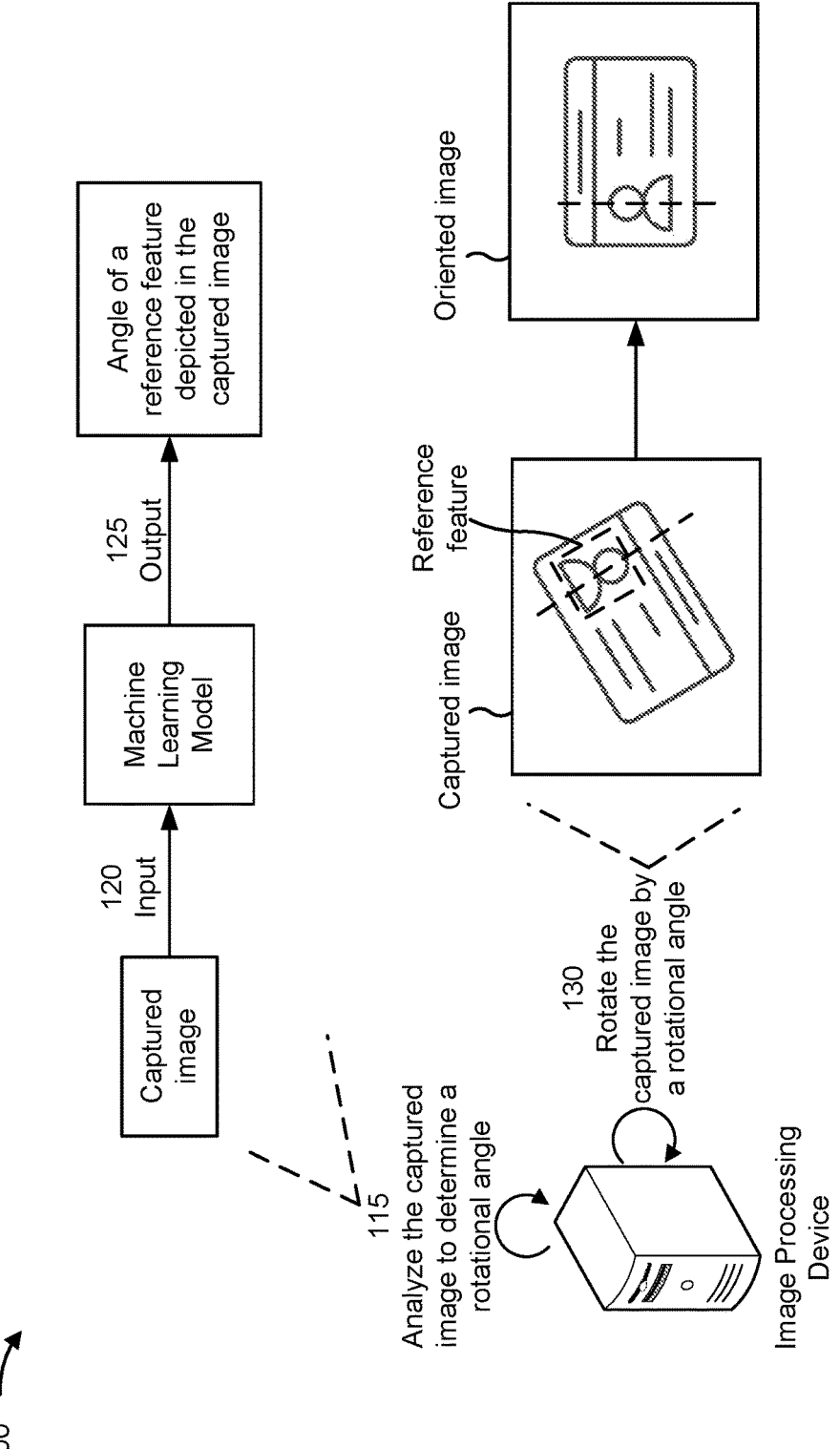
Figure 1C:
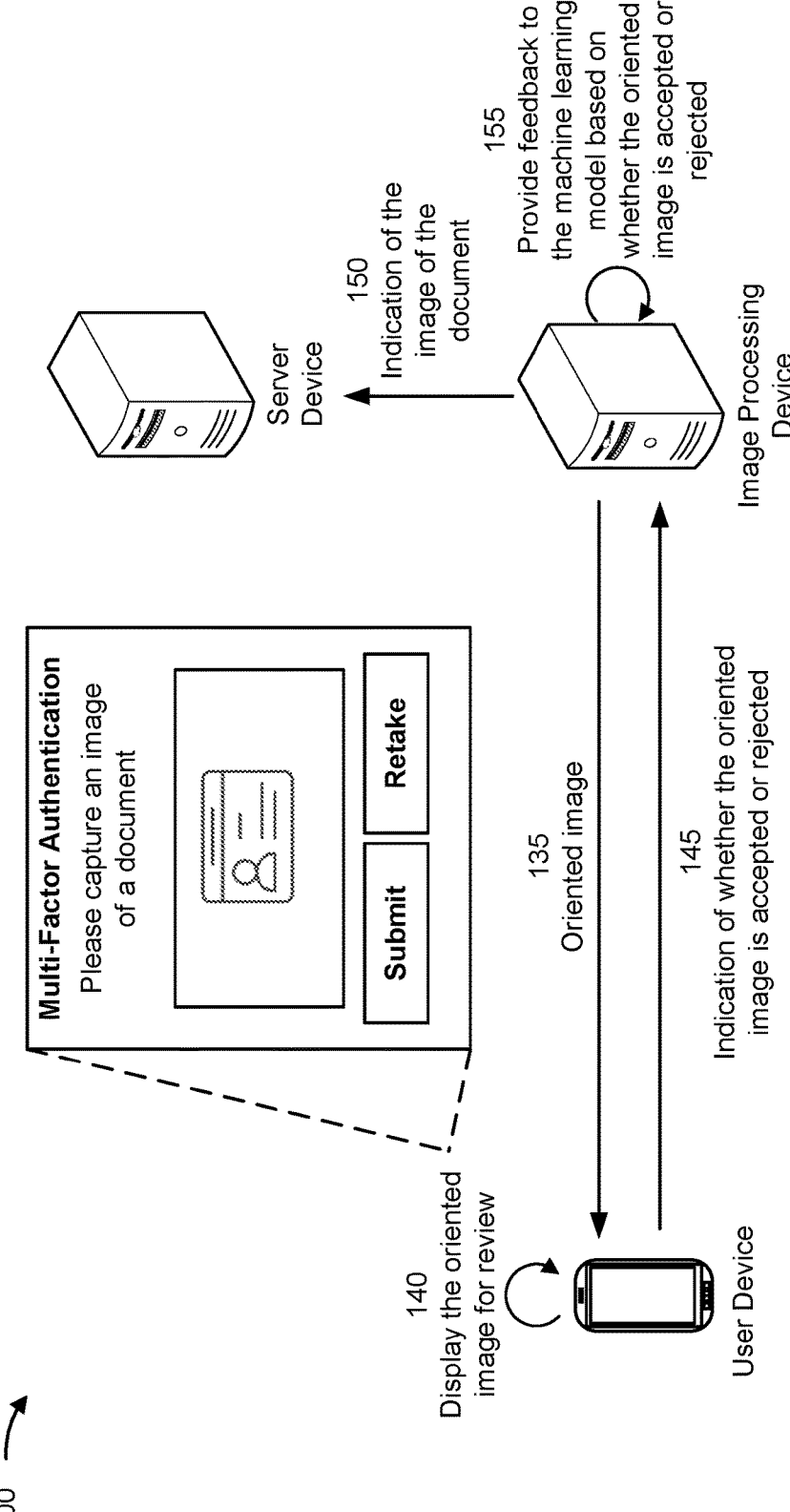

FIGS. 1A-1C are diagrams of an example 100 associated with automatic orientation correction for captured images. As shown in FIGS. 1A-1C, example 100 includes a user device, an image processing device, and a server device. These devices are described in more detail in connection with FIGS. 2 and 3.

In some implementations, the image processing device may be associated with the user device. For example, the image processing device and the user device may be the same device (e.g., a single device). As another example, the image processing device may be a component of the user device. In other implementations, the image processing device may be a separate device from the user device. In some implementations, the image processing device may be associated with an application executing on the user device and/or a web page visited by the user device. For example, the image processing device may be associated with an application and/or a web page that is associated with obtaining and/or processing images of documents, as described in more detail elsewhere herein.

As shown in FIG. 1A, and by reference number 105, the user device may capture an image of a document. For example, a camera or similar device associated with the user device may capture the image of the document. For example, a user may provide an input to the user device to capture the image of the document. In other examples, the image of the document may be downloaded by the user device and/or retrieved from a memory of the user device.

In some implementations, the image processing device may transmit, and the user device may receive, a request for the image of the document. For example, the image processing device may provide instructions to cause a request for the image of the document to be displayed by the user device. The user device may capture the image of the document in response to the request for the image of the document from the image processing device. For example, the image processing device may request the image of the document as part of an authentication procedure. The authentication procedure may be associated with authenticating the document and/or with authenticating an account (e.g., where providing an authenticated document is one authentication factor used to authenticate the account), among other examples. As another example, the image processing device may request the image of the document as part of an analysis of the document (e.g., to process the image of the document and/or to obtain information included in the document).

As shown by reference number 110, the image processing device may obtain the image of the document. For example, the user device may transmit, and the image processing device may receive, an indication of the image of the document. In some implementations, the user device may provide the image of the document from a memory of the user device. For example, the user device may upload the image of the document to the image processing device.

In some implementations, the document may be associated with a document type. The document type may indicate a type, category, and/or classification of the document. For example, the document type may include an identification document, a passport, a driver's license, a bank check (e.g., a personal check, a certified check, and/or a cashier's check), a contract, a birth certificate, and/or a social security card, among other examples. For example, a document type may be any type of document that is associated with a template form (e.g., a common template or similar template across all documents associated with the document type). For example, a document type may be associated with a template that defines one or more locations of features (e.g., referred to herein as "reference features") depicted in documents.

For example, a reference feature may be a field or element of a document that is located in the same, or similar, location in all documents associated with the document type. For example, a reference feature for a document type may be associated with one or more location parameters. The one or more location parameters may define a location, a size, and/or an orientation, among other examples, of the reference feature as depicted in documents associated with the document type. The known and/or expected orientation of a reference feature included in a document may enable the image processing device to determine a correct orientation of an image depicting the document (e.g., the reference feature as depicted in the image should be at the correct orientation as depicted in the image to ensure that the document is correctly orientated as depicted in the image). Examples of reference features may include a machine-readable code, a QR code, machine-readable zone (e.g., associated with a passport), a text field (e.g., a name field associated with indicating a name of a person associated with the document, an expiration date field, an issued date field, a header field, a title field, or another text field), a facial image (e.g., depicting an image of a face of a person associated with the document), a page number, a document identifier field, and/or a barcode, among other examples. For example, information and/or content associated with a reference feature may vary from document to document associated with a given document type, but an orientation of the reference feature may be the same, or similar, for all documents associated with the document type.

For example, as shown in FIG. 1A, the reference feature may include a facial image depicting a face of a person (e.g., a user). The captured image may depict the face of the user at an angle, such that the face of the user is not at an expected orientation. For example, the expected orientation for the face depicted in the facial image may be associated with one or more features of the face, such as the eyes, mouth, nose, and/or ears, among other examples. For example, the expected orientation for the face may be associated with eyes of the face being aligned horizontally, with the nose of the face being below the eyes, and/or with other orientations of features of the face. As described in more detail elsewhere herein, the image processing device may determine a rotation to be applied to the captured image based on an angle of the face (e.g., or other reference feature) as depicted in the captured image and an expected or known orientation of the face (e.g., or other reference feature).

As shown in FIG. 1B, and by reference number 115, the image processing device may analyze the captured image to determine a rotational angle to be applied to the captured image. For example, the image processing device may determine a rotational angle of a reference feature of the document as depicted in the captured image. For example, in some implementations, the image processing device may detect one or more reference points associated with the reference feature. As an example, if the reference feature is an image of a face, the reference points may be eyes, ears, a nose, a mouth, and/or another feature of the face. As another example, if the reference feature is a machine-readable code, the reference points may be a block or other pattern included in the machine-readable code. The image processing device may determine the rotational angle of the reference feature based on comparing an orientation between two or more reference points to an expected orientation of the two or more reference points.

The image processing device may determine the rotational angle of the reference feature based on comparing the reference feature as depicted in the image to one or more orientation parameters of the reference feature associated with a display orientation associated with the document. For example, the orientation parameters may indicate an expected or known orientation between reference points of the reference feature. As an example, the image processing device may identify or detect a first reference point and a second reference point included in the reference feature. The image processing device may determine the rotational angle based on a difference between a first angle between the first reference point and the second reference point as depicted in the image and a second angle associated with a known orientation of the first reference point and the second reference point. The known orientation may be an expected orientation or angle between the first reference point and the second reference point when the document is correctly oriented (e.g., correctly oriented to be viewed by a user). For example, if the reference feature is an image of a face, then an expected orientation between eyes of the face may be a horizontal orientation. The image processing device may determine the rotational angle of the reference feature based on comparing an angle between the eyes of the face and a reference angle corresponding to a horizontal orientation (e.g., zero degrees).

In some implementations, the image processing device may detect one or more patterns included in the machine-readable code as depicted in the orientated image. For example, a machine-readable code, such as a QR code, a barcode, and/or a machine-readable zone, among other examples, may include features that are included to enable a normalization and/or alignment of the machine readable code. For example, a QR code may include a nested series of black and white squares that, when detected and/or interpreted by the image processing device, enable the image processing device to determine the orientation of the QR Code. As another example, a barcode, such as a portable data file (PDF) 417 (PDF417) barcode, may include a start pattern and a stop pattern to enable the image processing device to detect a start and an end of the barcode. The image processing device may determine the orientation or angle of the barcode based on comparing an orientation between the detected start pattern and the detected stop pattern. For example, because the detected start pattern and the detected stop pattern are expected to be horizontal from one another with the start pattern on the left hand side with respect to the end pattern, the image processing device may be enabled to determine the rotational angle of the barcode based on a difference from the expected orientation.

In some implementations, the image processing device may use a machine learning model to obtain an indication of the angle of the reference feature. For example, as shown by reference number 120, the image processing device may input, to a machine learning model, the image of the document (e.g., the captured image of the document). The machine learning model being trained to identify rotational angles of a reference feature. For example, the image processing device may select the machine learning model to be used based on the reference feature or document type associated with the document. The image processing device may select a machine learning model that is trained to detect the reference feature. For example, an output of the machine learning model may include a rotational angle of the reference feature. In other words, the machine learning model may be trained to detect the reference feature in images and to determine the rotational angle of the reference feature. For example, if the reference feature is an image of a face of a person, then the image processing device may use a facial recognition model as the machine learning model.

In some implementations, the image processing device may input the captured image via an application programing interface (API). For example, the machine learning model may be associated with a third party service (e.g., may be associated with an entity that is different than an entity associated with the image processing device). The image processing device may transmit an API call that includes the captured image (e.g., to an API associated with the machine learning model). This reduces processing overhead and/or complexity associated with the image processing device determining the rotational angle of the reference feature of the document.

As shown by reference number 125, the image processing device may obtain, from an output of the machine learning model, an indication of the rotational angle of the reference feature depicted in the captured image (e.g., that is input to the machine learning model). For example, the image processing device may obtain, from the machine learning model, an indication of the rotational angle of the reference feature as depicted in the image (e.g., the captured image) based on inputting the image of the document to the machine learning model.

For example, the image processing device may input, to a machine learning model, the image of an identification document, where the machine learning model is a facial recognition model that is trained to identify rotational angles of faces. The image processing device may obtain, from the facial recognition model, an indication of a rotational angle of the face depicted in the facial image based on inputting, to the facial recognition model learning model, the image of the identification document.

As shown by reference number 130, the image processing device may rotate the capture image by a rotational angle. For example, the image processing device may rotate the image of the document by an angle (e.g., the rotational angle) to obtain an orientated image of the document. The rotational angle may be based on the rotational angle of the reference feature (e.g., as detected and/or obtained by the image processing device) and a reference angle associated with a display orientation of the identification document (e.g., an expected orientation or angle of the reference feature when the document is in the correct orientation to be viewed by a user). The image processing device may determine the display orientation based on a document type associated with the document. For example, different documents may be expected to be viewed by a user differently. Therefore, the image processing device may obtain the display orientation of the document (e.g., and/or an expected orientation or rotational angle of the reference feature) based on the document type and/or based on a type of reference feature.

In some implementations, the rotational angle may be based on the rotational angle of the reference feature as depicted in the image. For example, the rotational angle at which the image is rotated may be the rotational angle of the reference feature as depicted in the image. As another example, the rotational angle at which the image is rotated may be an additive inverse of the rotational angle of the reference feature as depicted in the image (e.g., such that the rotational angle at which the image is rotated and the rotational angle of the reference feature sum to zero). As another example, the rotational angle at which the image is rotated may be the rotational angle of the reference feature modified by a reference angle. For example, the reference angle may be based on the display orientation of the document. For example, the reference angle may be an angle at which the reference feature is to be displayed in the display orientation. The image processing device may rotate the image of the document such that the angle of the reference feature is modified to be the reference angle.

In some implementations, the image processing device may perform one or more operations to determine whether the oriented image of the document is correct. For example, the image processing device may detect one or more patterns included in a machine-readable code as depicted in the orientated image (e.g., in a similar manner as described above). The image processing device may determine whether the orientated image is in a correct orientation based on whether the one or more patterns are in an orientation associated with the machine-readable code. For example, where the reference feature is a barcode, the image processing device may determine whether a start pattern and an end pattern of the barcode are correctly oriented (e.g., with the start pattern on a left hand side with respect to the end pattern).

As another example, the image processing device may analyze, using a computer vision technique, a face of the person as depicted in the orientated image to identify one or more facial features of the face (e.g., where the reference feature is the face or where the reference feature is a different feature of the document). The image processing device may determine whether the orientated image is in a correct orientation based on whether the one or more facial features of the face are in known facial positions associated with respective facial features from the one or more facial features. The known facial positions may refer to positions of features on a face when correctly oriented. For example, the image processing device may determine whether a detected nose or a detected mouth of the face is below one or more eyes of the face.

As another example, the image processing device may analyze, using an optical character recognition (OCR) technique, one or more text fields as depicted in the orientated image of the document. The image processing device may detect whether the orientated image of the document is in a correct orientation based on whether text included in the one or more text fields is detectable using the OCR technique. For example, if the text is upside down, then the text in the one or more text fields may not be detectable using the OCR technique. As another example, the image processing device may determine an orientation of the text using the OCR technique. The image processing device may determine whether the orientated image of the document is in a correct orientation based on whether text included in the one or more text fields is in a correct orientation (e.g., in an orientation as read by a user).

If the image processing device determines that the oriented image is correctly oriented, then the image processing device may proceed with providing the oriented image for display to be reviewed by a user, as explained in more detail elsewhere herein. If the image processing device determines that the oriented image is not correctly oriented, then the image processing device may perform one or more operations to correct or modify the oriented image (e.g., before providing the oriented image for display). For example, the image processing device may rotate the oriented image by an angle (e.g., a step angle corresponding to a step size, such as 10 degrees, 45 degrees, 90 degrees, or 180 degrees). The image processing device may determine whether the oriented image (e.g., after rotating the oriented image) is correctly oriented in a similar manner as described elsewhere herein. The image processing device may continue to modify or rotate the oriented image until the image processing device determines that the oriented image depicts the document with a correct orientation (e.g., in the display orientation). Alternatively, if the image processing device determines that the oriented image is not correctly oriented, then the image processing device may refrain from performing additional operations and may detect that an error has occurred. This may conserve processing resources, computing resources, and/or power resources that would have otherwise been associated with proceeding with providing and/or modifying an oriented image that is not in the correct orientation.

In some implementations, the image processing device may identify an aspect ratio for a review page associated with the image of the document based on the orientated image of the identification document. For example, the image processing device may determine if the document is associated with a landscape orientation or a portrait orientation based on the oriented image. For example, if the oriented image has a longer width than height, then the image processing device may determine that the review page is to have a landscape orientation. This may enable the image processing device to correctly configure the review page that is to be used to display the oriented image for review to the user.

As shown in FIG. 1C, and by reference number 135, the image processing device may provide, and the user device may obtain, the orientated image of the document. For example, the image processing device may provide the oriented image of the document for display (e.g., by the user device). For example, the image processing device may transmit, and the user device may receive, the oriented image of the document. In some implementations, the image processing device may provide the orientated image of the document for display in a review page having the aspect ratio (e.g., determined by the image processing device as described in more detail elsewhere herein).

As shown by reference number 140, the user device may display the oriented image for review by a user. For example, as shown in FIG. 1C, the user device may display a review page that includes the oriented image (e.g., displayed the image of the document with the document in the display orientation). This may enable a user to more accurately review and/or approve the captured image of the document (e.g., as compared to providing the captured image as originally captured for review with the document not in the display orientation). In some implementations, the user device may obtain user input indicating whether the orientated image of the document has been accepted. For example, the user input may indicate that the image of the document is to be submitted (e.g., if the orientated image of the document has been accepted). As another example, the user input may indicate that another image if the document is to be captured (e.g., "retake") if the orientated image of the document is rejected. If the user input is "retake" the operations described herein may be performed again with a new image of the document.

As shown by reference number 145, the user device may provide, and the image processing device may obtain, an indication of whether the oriented image is accepted or rejected. For example, the image processing device may receive, from the user device, feedback information indicating whether the orientated image of the document has been accepted. As shown by reference number 150, if the feedback information indicates that the oriented image of the document has been accepted and/or approved (e.g., if the feedback indicates an approval of the oriented image), then the image processing device may providing, to a server, an indication of the orientated image or the captured image (e.g., the image before the rotation is applied by the image processing device). For example, the image processing device may transmit and/or provide the oriented image or the captured image to the server device as part of an authentication procedure associated with the user device and/or the document (e.g., the server may be an authentication server that performs an authentication of the document as depicted in the image).

In some implementations, machine learning models described herein may be re-trained using feedback information. For example, feedback may be provided to the machine learning model(s). The feedback may be associated with actions performed based on the recommendations provided by the machine learning model(s) and/or automated actions performed, or caused, by the machine learning model(s). In other words, the recommendations and/or actions output by the machine learning model(s) may be used as inputs to re-train the machine learning model (e.g., a feedback loop may be used to train and/or update the machine learning model(s)). For example, as shown by reference number 155, the feedback information may include an indication of whether the oriented image is accepted or rejected by the user. For example, the image processing device may provide, to the machine learning model(s), the feedback information for training the machine learning model(s) to identify the rotational angles of a reference feature (e.g., of a face or another reference feature described herein). This improves an accuracy of rotational angle determinations made by the machine learning model(s).

In some implementations, the image processing device may modify the display orientation based on the feedback information indicating that the orientated image of the identification document has been rejected. For example, the image processing device may modify the display orientation for future attempts to re-capture the image of the document. Additionally, or alternatively, the image processing device may modify the display orientation for future operations associated with images of documents having the same document type as the document. In other words, the image processing device may use the feedback provided by the user to improve the display orientation for future automatic rotations performed (e.g., performed in a similar manner as described herein) for images of other documents having the document type. In some implementations, the image processing device may modify the display orientation by configured amount, such as 2 degrees, 5 degrees, 10 degrees, 45 degrees, 90 degrees, or another amount. In some implementations, the image processing device may modify the display orientation based on the feedback provided to the user (e.g., the feedback may indicate an error associated with the oriented image, such as indicating that the oriented image was upside down).

As a result, the image processing device may be enabled to correctly orient the image of the document by using the rotational angle of the reference feature as depicted in the image of the document. For example, the image processing device may use an orientation of a face as depicted in the image of the document to rotate the image of the document such that the face is orientated correctly (e.g., because the correct orientation of the document is associated with the face being oriented correctly). As a result, the image processing device may reliably and correctly orient or rotate images of documents to a correct orientation (e.g., without relying on an orientation of the edges of the document which produces unreliable orientation results, as described above). This may conserve processing resources, computing resources, and/or power resources that would have otherwise been associated with performing additional operations to identify that the document is not correctly depicted, correcting the orientation of the image, and/or capturing or obtaining new images of the document, among other examples. Further, the image of the document may be displayed to a user for review with the document depicted in the correct orientation. This may conserve processing resources, computing resources, and/or power resources that would have otherwise been associated with capturing the additional images due to the image being displayed for review to the user in the incorrect orientation (e.g., where further processing or authentication of the document could have otherwise proceeded with the original image).

As indicated above, FIGS. 1A-1C are provided as an example. Other examples may differ from what is described with regard to FIGS. 1A-1C.

Figure 2:
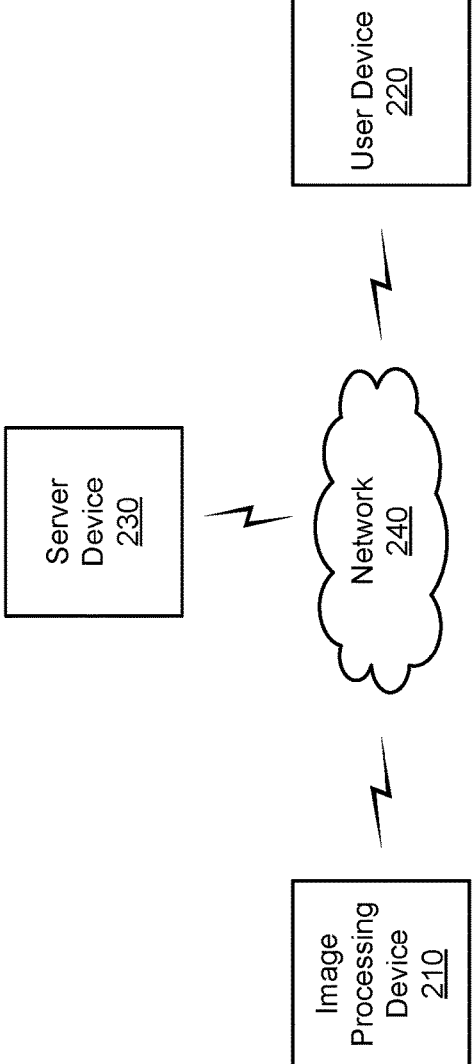
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include an image processing device 210, a user device 220, a server device 230, and a network 240. Devices of environment 200 may interconnect via wired connections, wireless connections, or a combination of wired and wireless connections.

The image processing device 210 may include one or more devices capable of receiving, generating, storing, processing, providing, and/or routing information associated with automatic image cropping using a reference feature, as described elsewhere herein. The image processing device 210 may include a communication device and/or a computing device. For example, the image processing device 210 may include a server, such as an application server, a client server, a web server, a database server, a host server, a proxy server, a virtual server (e.g., executing on computing hardware), or a server in a cloud computing system. In some implementations, the image processing device 210 may include computing hardware used in a cloud computing environment. In some implementations, the image processing device 210 may be associated with, or included in, the user device 220. For example, the image processing device 210 may be a component of the user device 220. In other examples, the image processing device 210 may be separate from (e.g., a separate device from) the user device 220.

The user device 220 may include one or more devices capable of receiving, generating, storing, processing, and/or providing information associated with automatic image cropping using a reference feature, as described elsewhere herein. The user device 220 may include a communication device and/or a computing device. For example, the user device 220 may include a wireless communication device, a mobile phone, a user equipment, a laptop computer, a tablet computer, a desktop computer, a gaming console, a wearable communication device (e.g., a smart wristwatch, a pair of smart eyeglasses, a head mounted display, or a virtual reality headset), or a similar type of device.

The server device 230 may include one or more devices capable of receiving, generating, storing, processing, providing, and/or routing information associated with automatic image cropping using a reference feature, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The network 240 may include one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
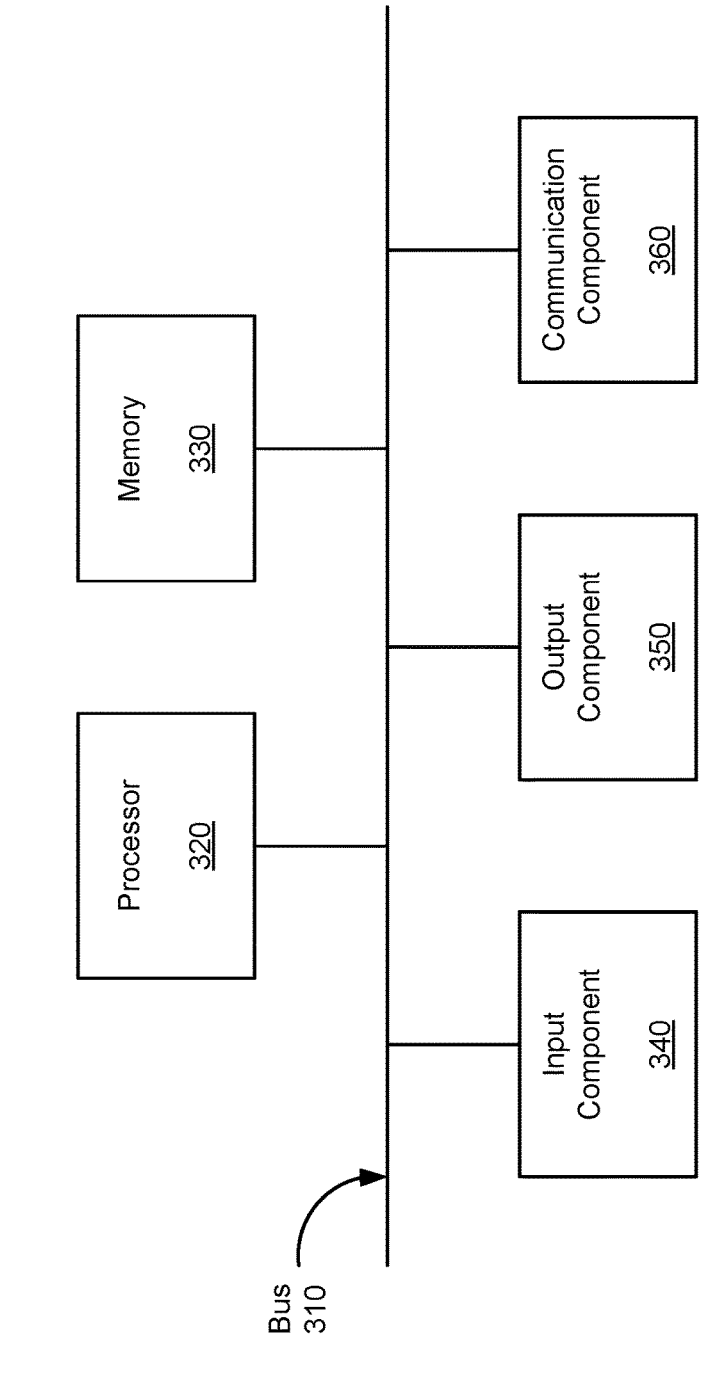
FIG. 3 is a diagram of example components of a device associated with automatic orientation correction for captured images, in accordance with some embodiments of the present disclosure.

FIG. 3 is a diagram of example components of a device 300 associated with automatic orientation correction for captured images. The device 300 may correspond to the image processing device 210, the user device 220, and/or the server device 230, among other examples. In some implementations, the image processing device 210, the user device 220, and/or the server device 230, among other examples, may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with automatic orientation correction for captured images. In some implementations, one or more process blocks of FIG. 4 may be performed by the image processing device 210. In some implementations, one or more process blocks of FIG. 4 may be performed by another device or a group of devices separate from or including the image processing device 210, such as the user device 220, and/or the server device 230, among other examples. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving an image of a document, the image depicting a reference feature associated with the document, the reference feature including at least one of: a face of a person, a machine-readable code, and/or a text field (block 410). For example, the image processing device 210 (e.g., using processor 320, memory 330, input component 340, and/or communication component 360) may receive an image of a document, the image depicting a reference feature associated with the document, the reference feature including at least one of: a face of a person, a machine-readable code, and/or a text field, as described above in connection with reference number 110 of FIG. 1A. As an example, the image processing device 210 may receive and/or obtain the image of the document to facilitate authentication and/or analysis of the document.

As further shown in FIG. 4, process 400 may include identifying a rotational angle of the reference feature as depicted in the image based on comparing the reference feature as depicted in the image to one or more orientation parameters of the reference feature associated with a display orientation associated with the document (block 420). For example, the image processing device 210 (e.g., using processor 320 and/or memory 330) may identify a rotational angle of the reference feature as depicted in the image based on comparing the reference feature as depicted in the image to one or more orientation parameters of the reference feature associated with a display orientation associated with the document, as described above in connection with reference number 115, 120, and/or 125 of FIG. 1B. As an example, the one or more orientation parameters may indicate an angle of the reference feature at which the reference feature is depicted in the display orientation associated with the document (e.g., the orientation at which the document is expected to be viewed by a person). The image processing device 210 may identify or calculate the rotational angle of the reference feature based on comparing detected features of the reference feature and determining a difference between an orientation of the reference feature (e.g., as depicted in the image) and an orientation indicated by the one or more orientation parameters. As another example, the image processing device may identify the rotational angle of the reference feature from an output of a machine learning model (e.g., where an input to the machine learning model includes the image of the document and/or the one or more orientation parameters), as described in more detail elsewhere herein.

As further shown in FIG. 4, process 400 may include rotating the image of the document by an angle to obtain an orientated image of the document, the angle being based on the rotational angle of the reference feature as depicted in the image (block 430). For example, the image processing device 210 (e.g., using processor 320 and/or memory 330) may rotate the image of the document by an angle to obtain an orientated image of the document, the angle being based on the rotational angle of the reference feature as depicted in the image, as described above in connection with reference number 130 of FIG. 1B. As an example, the image processing device 210 may rotate the image of the document such that the reference feature is oriented as expected for the display orientation of the document. In other words, the image processing device 210 may rotate the image of the document so that the reference feature is oriented as the reference feature is expected to be viewed by a person.

As further shown in FIG. 4, process 400 may include providing the orientated image of the document for display (block 440). For example, the image processing device 210 (e.g., using processor 320 and/or memory 330) may provide the orientated image of the document for display, as described above in connection with reference number 135 of FIG. 1C. As an example, the image processing device 210 may provide the oriented image to a user device (e.g., the user device 220) to enable the user device to display the oriented image for review. For example, the image processing device 210 may cause user device 220 to display the oriented image for review by a user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code-it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for automatic orientation correction for captured images, the system comprising:

one or more memories; and one or more processors, communicatively coupled to the one or more memories, configured to:

obtain, via a user device, an image of an identification document, the identification document including a facial image depicting a face of a person associated with the identification document;

select a machine learning model, from a plurality of machine learning models, based on at least one of one or more reference features associated with the identification document or a document type associated with the identification document, wherein the machine learning model is a facial recognition model that is trained to identify rotational angles of faces, and wherein one of the one or more reference features is associated with a facial image;

input, to the selected machine learning model, the image of the identification document;

obtain, from the selected machine learning model, an indication of a rotational angle of the face depicted in the facial image based on inputting, to the selected machine learning model, the image of the identification document;

rotate the image of the identification document by an angle to obtain an orientated image of the identification document, the angle being based on the rotational angle of the face and a reference angle associated with a display orientation of the identification document;

provide the orientated image of the identification document for display;

receive feedback information indicating whether the oriented image has been accepted;

transmit, based on the feedback information, the oriented image or the image of the identification document to a server device for use in an authentication procedure related to the user device; and re-train, based on the feedback information, the selected machine learning model.

2. The system of claim 1, wherein the one or more processors are further configured to:

modify the display orientation based on the feedback information indicating that the orientated image of the identification document has been rejected.

3. The system of claim 1, wherein the display orientation of the identification document is an orientation at which images of the identification document are to be viewed.

4. The system of claim 1, wherein the one or more processors are further configured to:

analyze, using an optical character recognition (OCR) technique, one or more text fields as depicted in the orientated image of the identification document; and detect whether the orientated image of the identification document is in a correct orientation based on whether text included in the one or more text fields is detectable using the OCR technique.

5. The system of claim 1, wherein the one or more processors are further configured to:

identify an aspect ratio for a review page associated with the image of the identification document based on the orientated image of the identification document.

6. The system of claim 5, wherein the one or more processors, to provide the orientated image of the identification document for display, are configured to:

provide the orientated image of the identification document for display in the review page having the aspect ratio.

7. The system of claim 1, wherein the one or more processors, when re-training the selected machine learning model, are configured to:

re-train the selected machine learning model with the feedback information to identify the rotational angles of faces.

8. The system of claim 7, wherein re-training the selected machine learning model with the feedback information improves an accuracy of rotational angle determinations.

9. A method of automatic orientation correction for captured images, comprising:

receiving, by a device, an image of a document, the image depicting a reference feature associated with the document, the reference feature including at least one of:

a face of a person, a machine-readable code, or a text field;

selecting, by the device, a machine learning model, from a plurality of machine learning models, based at least on one of the reference feature or a document type associated with the document;

identifying, by the device and using the selected machine learning model, a rotational angle of the reference feature as depicted in the image based on comparing the reference feature as depicted in the image to one or more orientation parameters of the reference feature associated with a display orientation associated with the document;

rotating, by the device, the image of the document by an angle to obtain an orientated image of the document, the angle being based on the rotational angle of the reference feature as depicted in the image;

providing, by the device, the orientated image of the document for display;

receiving, by the device, feedback information indicating whether the oriented image has been accepted;

transmitting, by the device and based on the feedback information, the oriented image or the image of the document to a server device as part of an authentication procedure; and re-training, by the device and based on the feedback information, the selected machine learning model.

10. The method of claim 9, wherein identifying the rotational angle of the reference feature comprises:

inputting, to the selected machine learning model, the image of the document, the selected machine learning model being trained to identify rotational angles of the reference feature; and obtaining, from the selected machine learning model, an indication of the rotational angle of the reference feature as depicted in the image based on inputting the image of the document to the machine learning model.

11. The method of claim 9, wherein identifying the rotational angle of the reference feature comprises:

identifying a first reference point and a second reference point included in the reference feature; and determining the rotational angle based on a difference between a first angle between the first reference point and the second reference point as depicted in the image and a second angle associated with a known orientation of the first reference point and the second reference point.

12. The method of claim 9, wherein the reference feature includes the face of the person, the method further comprising:

analyzing, using a computer vision technique, the face of the person as depicted in the orientated image to identify one or more facial features of the face; and determining whether the orientated image is in a correct orientation based on whether the one or more facial features of the face are in known facial positions associated with respective facial features from the one or more facial features.

13. The method of claim 9, wherein the reference feature includes the machine-readable code, the method further comprising:

detecting one or more patterns included in the machine-readable code as depicted in the orientated image; and determining whether the orientated image is in a correct orientation based on whether the one or more patterns are in an orientation associated with the machine-readable code.

14. The method of claim 9, wherein re-training the selected machine learning model comprises:

re-training the selected machine learning model with the feedback information to identify rotational angles of faces.

15. A non-transitory computer-readable medium storing a set of instructions, the set of instructions comprising:

one or more instructions that, when executed by one or more processors of a device, cause the device to:

obtain, via a user device, an image of an identification document, the identification document including a facial image depicting a face of a user associated with the identification document;

select a machine learning model, from a plurality of machine learning models, based on at least one of one or more reference features associated with the identification document or a document type associated with the identification document, wherein the machine learning model is a facial recognition model that is trained to identify rotational angles of faces, and wherein one of the one or more reference features is associated with a facial image;

input, to the selected machine learning model, the image of the identification document;

obtain, from the selected machine learning model, an indication of a rotational angle of the face depicted in the facial image based on inputting, to the selected machine learning model, the image of the identification document;

rotate the image of the identification document by an angle to obtain an orientated image of the identification document, the angle being based on the rotational angle of the face and a reference angle associated with a display orientation of the identification document;

provide the orientated image of the identification document for display;

receive feedback information indicating whether the oriented image has been accepted;

transmit, based on the feedback information, the oriented image or the image of the identification document to a server device as part of an authentication procedure related to the user device; and re-train, based on the feedback information, the selected machine learning model.

16. The non-transitory computer-readable medium of claim 15, wherein the one or more instructions further cause the device to:

modify the display orientation based on the feedback information indicating that the orientated image of the identification document has been rejected.

17. The non-transitory computer-readable medium of claim 15, wherein the one or more instructions further cause the device to:

analyze one or more text fields as depicted in the orientated image of the identification document; and detect whether the orientated image of the identification document is in a correct orientation based on whether text included in the one or more text fields is detectable.

18. The non-transitory computer-readable medium of claim 15, wherein the one or more instructions, that cause the device to provide the orientated image of the identification document for display, cause the device to:

provide the orientated image of the identification document for display in a review page having a display orientation associated with the image of the identification document based on the orientated image of the identification document.

19. The non-transitory computer-readable medium of claim 15, wherein the one or more instructions, to retrain the selected machine learning model, further cause the device to:

re-train the selected machine learning model with the feedback information to identify the rotational angles of faces.

20. The non-transitory computer-readable medium of claim 19, wherein re-training the selected machine learning model with the feedback information improves an accuracy of rotational angle determinations.

* * * * *